(12) United States Patent
Dobson et al.

(10) Patent No.: US 7,628,414 B2
(45) Date of Patent: Dec. 8, 2009

(54) VEHICLE ROLL STABILIZING DAMPER SYSTEM

(75) Inventors: Kenneth S. Dobson, Chicago, IL (US); Robert K. Dutzi, Palatine, IL (US); Jason K. Trotter, Des Plaines, IL (US)

(73) Assignee: Illinois Tool Works Inc., Glenview, IL (US)

( * ) Notice: Subject to any disclaimer, the term of this patent is extended or adjusted under 35 U.S.C. 154(b) by 499 days.

(21) Appl. No.: 11/188,682

(22) Filed: Jul. 25, 2005

(65) Prior Publication Data

US 2006/0027990 A1 Feb. 9, 2006

Related U.S. Application Data

(60) Provisional application No. 60/599,722, filed on Aug. 6, 2004.

(51) Int. Cl.
*B60G 21/73* (2006.01)
*B60G 21/55* (2006.01)

(52) U.S. Cl. .................. 280/124.106; 280/124.134; 280/124.152; 280/124.16

(58) Field of Classification Search .......... 280/124.106, 280/124.134, 124.135, 124.152, 124.16, 280/124.161, 124.162, 5.502, 5.507, 5.508, 280/5.509, 5.511, 5.512
See application file for complete search history.

(56) References Cited

U.S. PATENT DOCUMENTS

| | | | |
|---|---|---|---|
| 3,292,945 A * | 12/1966 | Dangauthier | 280/6.159 |
| 3,397,895 A | 8/1968 | Kuniskis | |
| 4,033,605 A * | 7/1977 | Smith et al. | 280/6.157 |
| 4,470,611 A * | 9/1984 | Duphily et al. | 280/104 |
| 4,519,627 A | 5/1985 | Shibahata et al. | |
| 4,546,997 A | 10/1985 | Smyers | |
| 4,966,390 A | 10/1990 | Lund et al. | |
| 5,108,126 A * | 4/1992 | Banse | 280/86.757 |
| 5,230,529 A | 7/1993 | Harvey-Bailey | |
| 5,505,479 A * | 4/1996 | Lee | 280/124.107 |
| 5,732,969 A | 3/1998 | Spoto | |
| 5,772,224 A * | 6/1998 | Tong | 280/5.509 |
| 6,039,335 A * | 3/2000 | Sheridan | 280/124.103 |
| 6,059,276 A | 5/2000 | Dutzi et al. | |
| 6,736,419 B2 * | 5/2004 | Carlstedt et al. | 280/124.106 |

(Continued)

FOREIGN PATENT DOCUMENTS

DE 946412 8/1956

(Continued)

*Primary Examiner*—Paul N Dickson
*Assistant Examiner*—Drew Brown
(74) *Attorney, Agent, or Firm*—Mark W. Croll; Paul F. Donovan

(57) ABSTRACT

A damper system is connected between pivotal components of a vehicle suspension system to inhibit movement of the components during a condition of potential vehicle roll. The system can be actively or passively controlled. The damper system can have a single damper or multiple dampers and may be connected to work in conjunction with vehicle stabilizers including torsion bars, single compensator stabilizing systems and dual compensator stabilizing systems. In the compensator stabilizing systems, the damper can be separate from the compensators or integral with the compensators. The dampers also can be formed as integral structures with shock absorbers. The dampers can be of various types, including but not limited to linear dampers and rotary dampers.

26 Claims, 8 Drawing Sheets

U.S. PATENT DOCUMENTS

| | | |
|---|---|---|
| 7,077,407 B2 * | 7/2006 | Shin .................... 280/124.107 |
| 7,384,054 B2 * | 6/2008 | Heyring et al. ........ 280/124.157 |
| 2003/0085542 A1 * | 5/2003 | Carlstedt et al. ....... 280/124.106 |
| 2003/0090080 A1 | 5/2003 | Trotter et al. |

FOREIGN PATENT DOCUMENTS

| | | |
|---|---|---|
| DE | 2309565 | 8/1974 |
| GB | 488172 | 7/1938 |
| JP | 05085140 | 4/1993 |
| JP | 09002043 | 1/1997 |

\* cited by examiner

VEHICLE ROLL STABILIZING DAMPER SYSTEM

CROSS-REFERENCE TO RELATED APPLICATIONS

The present regular U.S. Patent Application claims the benefits of U.S. Provisional Patent Application Ser. No. 60/599,722 filed on Aug. 6, 2004.

FIELD OF THE INVENTION

The present invention relates generally to vehicle suspension systems, and more particularly, the invention pertains to roll stabilizing systems for responding to and inhibiting potential roll conditions caused by sudden vehicle movements.

BACKGROUND OF THE INVENTION

Under certain driving conditions and situations, a driver may cause the vehicle to undergo a hard turn, a quick turn, or a series of hard and quick turns. Such conditions can be experienced during high speed maneuvers which may occur on freeway entrance ramps, merging lanes and the like. Quick maneuvers also occur to avoid accidents or objects. During such maneuvers, the vehicle body tends to elevate on one side and lower on the opposite side very suddenly. This condition is referred to as vehicle body roll. High profile vehicles such as trucks, sports utility vehicles, vans and the like experience roll conditions more readily than lower profile vehicles.

Many different types of vehicle suspension and stabilizer systems have been used for both passenger comfort and driving stability. Primary suspension system components operate to control a single wheel assembly movement relative to the vehicle frame and can include springs and/or dampers provide spring force to suspend the vehicle body. The primary suspension system components further provide damping resistance to suspended body motion, but only a minimal resistance to vehicle body roll. Roll stabilizer systems are often cross-connected from one wheel assembly to the other and provide spring force to return the vehicle body to a neutral position or condition when forces from sudden vehicle movements have cause the body to lean one direction or the other. Accordingly, stabilizer systems operate to return the vehicle body from a roll condition to a neutral condition.

A variety of roll stabilizer systems are known. Torsion stabilizer systems utilize a stabilizer bar, bar bushings and links in series attached to the primary suspension system and vehicle frame. The stabilizer bar acts as a torsion spring to return the vehicle body to a neutral condition when forces have caused to body to lean or roll. Several types of linear roll stabilizer systems are also known connected across the vehicle between primary suspension components. In a single compensating stabilizer system one anti-roll compensator is provided and operates as a tension and compression spring. The anti-roll compensator is attached to the primary suspension with one bell crank on each control arm. In a dual compensating linear stabilizer system two anti-roll compensators are provided. The compensators work as a pair of tension springs and are under no load in compression. The anti-roll compensators attach to the primary suspension with two bell cranks on each control arm, with each compensator attached to an upper bell crank on one control arm and to a lower bell crank on the other control arm.

While stabilizer systems as described operate effectively to return the vehicle to a neutral condition after vehicle body roll has been experienced, known systems provide minimal roll resistance or "damping" to inhibit the initial entry of the vehicle body into a roll condition. In a torsional stabilizer system roll damping results only from compliance in the end links and bar bushings. In linear stabilizer systems, either single compensating or dual compensating stabilizer systems, some inherent roll damping results from the elastomeric spring elements. However, such damping is minimal.

To provide improved vehicle body roll damping, in the past attempts have been made to "tune" vehicle primary suspension systems. The primary suspension dampers, such as shocks and/or struts and other suspension geometry or architecture can be altered to improve roll damping. However, tuning roll damping into the primary suspension systems is limited by the suspension dampers primary functions and the suspension geometry. Generally, tuning the primary suspension system to provide greater roll resistance is achieved at the expense of vehicle ride comfort. To provide adequate roll resistance or damping may not be acceptable with known suspension system tuning, as the reduction in ride comfort is too severe.

What is needed is a roll damping system that works in conjunction with primary suspension system components and roll stabilizer systems, without compromising the performance thereof.

SUMMARY OF THE INVENTION

The present invention provides a damping element in a cross vehicle configuration mounted similarly to anti-roll compensator spring elements used in both dual and single compensator stabilizer systems. One damper or multiple dampers can be used independent of the vehicle stabilizer system or in parallel or in series with the stabilizer system.

In one aspect thereof, the present invention provides a body roll damping system for a motor vehicle, with first and second pivotal suspension components pivotally rotatable about first and second axes. At least one roll damper has first and second connections to the first and second pivotal components. The at least one roll damper and the first and second connections are associated and operative with one another such that the roll damper provides increased resistance to substantially simultaneous rotation of the first and second pivotal suspension components in the same rotational direction about the first and second axes, and lessened resistance to rotation of the first and second pivotal suspension components in opposite rotational directions about the first and second axes, or rotation of one of the first and second suspension components without significant rotation of the other of the first and second pivotal suspension components.

In another aspect thereof, the present invention provides a vehicle front wheel assembly with first and second primary suspension systems having first and second pivotal suspension components pivotally rotatable about first and second axes. At least one roll stabilizer is connected to the first and second suspension components. At least one axial roll damper has first and second connections to the first and second pivotal components. The at least one axial roll damper and the connections are associated and operative with one another such that the damper provides increased resistance to substantially simultaneous rotation of the first and second pivotal suspension components in the same rotational direction about the first and second axes, and lessened resistance to rotation of the first and second pivotal suspension components in opposite rotational directions about the first and second axes, or rotation of one of the first and second pivotal suspension components without significant rotation of the other of the first and second components.

In a still further aspect thereof, the present invention provides a vehicle suspension system with first and second primary suspension systems including first and second pivotal components; a roll stabilizer system interconnecting the first and second pivotal components; and a roll damping system interconnecting said first and second pivotal components.

An advantage of the present invention is providing a vehicle body roll damping system that can work together with but is adjustable independently of a vehicle primary suspension system and a roll stabilizer system allowing tuning of the primary suspension system for driving comfort and independent tuning of the roll damping system for damping performance.

Another advantage of the present invention is providing a vehicle body roll damping system that can be integral with the roll stabilizer system.

Still another advantage of the present invention is providing a vehicle body roll damping system that can be independent of the roll stabilizer system.

A further advantage of the present invention is providing a vehicle body roll damping system that can be installed in conjunction with both single and dual compensator stabilizing systems.

A yet a further object of the present invention is providing a vehicle body roll damping system that can be installed with roll stabilizer bar systems.

Yet another advantage of the present invention is providing a vehicle body roll damper system that can be installed in advantageous locations above or below the lower control arms.

Other features and advantages of the invention will become apparent to those skilled in the art upon review of the following detailed description, claims and drawings in which like numerals are used to designate like features.

Figure 1:
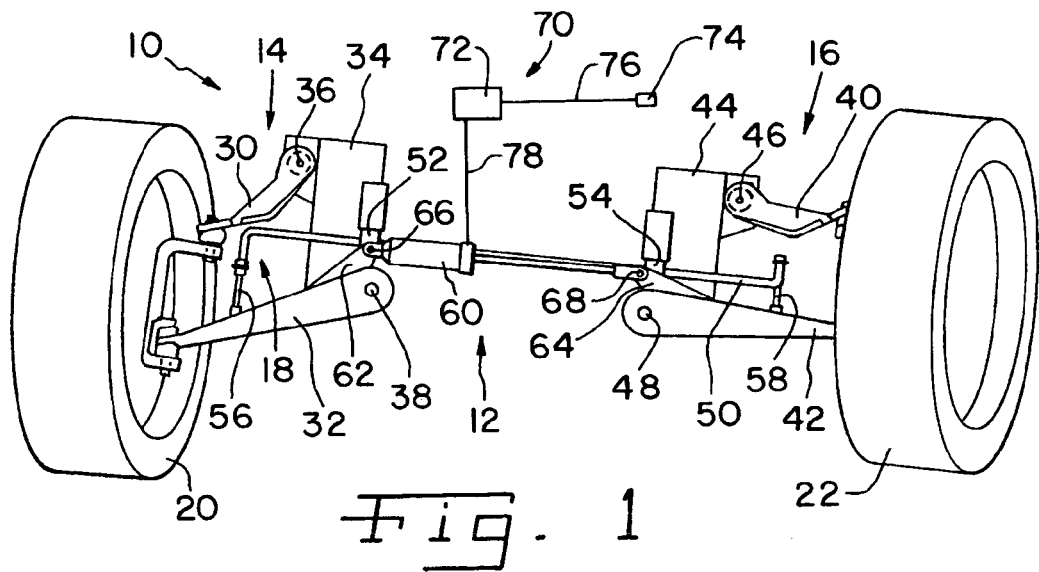
FIG. 1 is a perspective view of a portion of a vehicle with a roll damper system in accordance with the present invention installed with conventional primary suspension and stabilizer bar systems.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a front wheel assembly of a motor vehicle having a roll damping system 12 in accordance with the present invention. Front wheel assembly 10 further includes first and second primary suspension systems 14 and 16 and a torsional roll stabilizer system 18 for controlling the movements of wheels 20 and 22.

Primary suspension system 14 includes an upper control arm 30 and a lower control arm 32 each interconnected with a frame member 34 about pivotal connections 36 and 38, respectively. The manner in which upper and lower control arms 30 and 32, frame 34, pivotal connections 36, 38 and wheel 20 are interrelated one with another are conventional and well-understood by those skilled in the art. Accordingly, further explanation thereof will not be provided herein. Similarly, primary suspension system 16 includes an upper control arm 40 and a lower control arm 42 each interconnected with a frame member 44 about pivotal connections 46 and 48, respectively. Again, the manner in which upper and lower control arms 40 and 42, frame member 44, pivotal connection 46, 48 and wheel 22 are interrelated one with another is well-known to those skilled in the art and will not be described in greater detail herein.

Torsional roll stabilizer system 18 includes a torsion bar 50 held in bar bushings 52 and 54 connected to frame members 34 and 44 respectively. End links 56 and 58 connect torsion bar 50 to lower control arms 32 and 42, respectively. Torsional roll stabilizer system 18 is of known design well-understood by those skilled in the art and will not be described in greater detail herein.

Roll damping system 12 includes a linear damper 60 and bell cranks 62 and 64. Bell cranks 62 and 64 are connected to lower control arms 32 and 42, respectively, and opposite ends of damper 60 are connected to bell cranks 62 and 64 about pivotal connections 66 and 68, respectively. Damper 60 thereby operates independently of torsional roll stabilizer system 18, and can be independently and separately adjusted for the desired degree of vehicle body roll damping.

Suitable linear dampers for the present invention can be of design and construction for providing damping in tension, or in compression or in both. Accordingly, the installation can be located and positioned advantageously, as will be described more fully hereinafter. The damper can be an active damper or a passive damper. Active damping can be accomplished using a closed-loop feedback system receiving vehicle roll inputs and providing damping resistance through active dampers.

Magnetic fluid, electronic valve control and various other means are all known approaches and constructions for actively controlling the performance of linear and other dampers. For example, it is known to construct dampers using magnetic fluid, commonly referred to as MR fluid (magnetorheological fluid). Electric voltage can be applied to the fluid to change the fluid viscosity and the damping resistance applied by the damper. A damper of this type can be used in the present invention with an active control system that applies voltage to the fluid in response to sensor inputs indicative of vehicle body roll conditions. Accordingly, the damper can be activated in response to roll conditions and can remain inactive during normal operation conditions to which the primary suspension system responds. FIG. 1 illustrates schematically an exemplary arrangement of a control system 70, including a controller 72 connected to one or more sensors 74 via data lines 76, and to damper 60 via a control connection 78 for applying voltage thereto to adjustably control the performance of damper 60. Sensor or sensors 74 are positioned advantageously on the vehicle suspension and/or body to generate inputs to controller 72 indicative of the body and suspension positions and/or movements. Controller 72 is programmed to receive and interpret the inputs from sensor or sensors 74 and to generate and transmit control signals to control the performance of damper 60.

A linear damper having electronic valve control also can be used in an active roll damping system of the present invention. A valve or orifice within the damper can be controllably opened or closed in response to the conditions sensed by control system 70, to control the rate at which fluid flows within the damper, and thereby modulating the performance of the damper.

Hydraulic, pneumatic and other pressure operating dampers can be used in the present invention. The damping resistance or rate can be changed by providing a change in pressure in damper 60 similarly to gas-charged or air shock absorbers used in primary suspension systems.

FIGS. 2-5 illustrate similar front wheel assemblies as that shown and described with respect to FIG. 1. Accordingly, each includes primary suspension system 14 associated with wheel 20 and a primary suspension system 16 associated with wheel 22. Torsional roll stabilizer system 18 is provided similarly to that shown in FIG. 1. Accordingly, FIGS. 2-5 include elements numbered the same as those shown and described in FIG. 1, while further illustrating modified installations of a roll damping system in accordance with the present invention.

Figure 2:
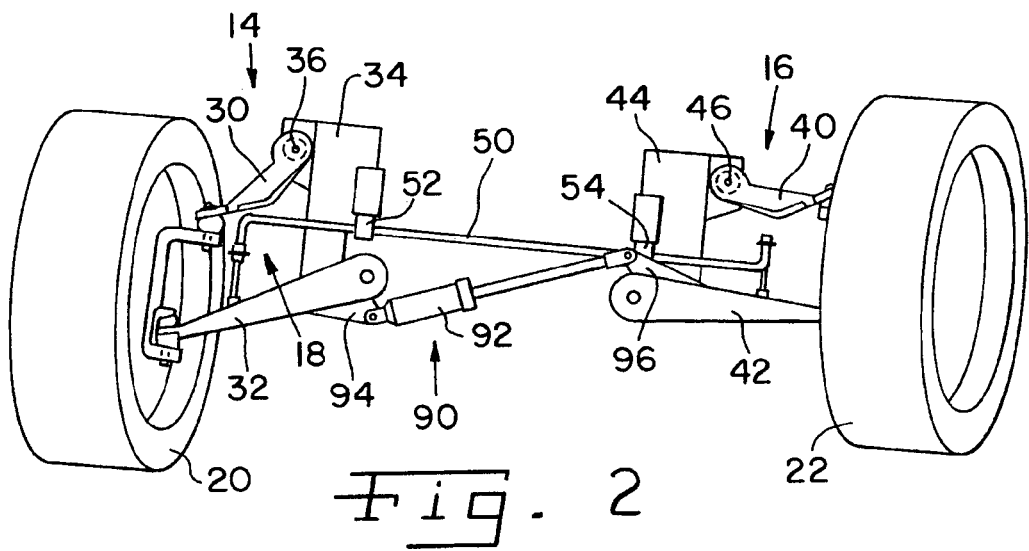
FIG. 2 is a perspective view similar to that of FIG. 1, but illustrating an alternative manner and location for mounting the roll damper system.

FIG. 2 illustrates roll damping system 90 having a damper 92 connected between a bell crank 94 at the bottom of lower control arm 32 and a bell crank 96 above lower control arm 42.

Figure 3:
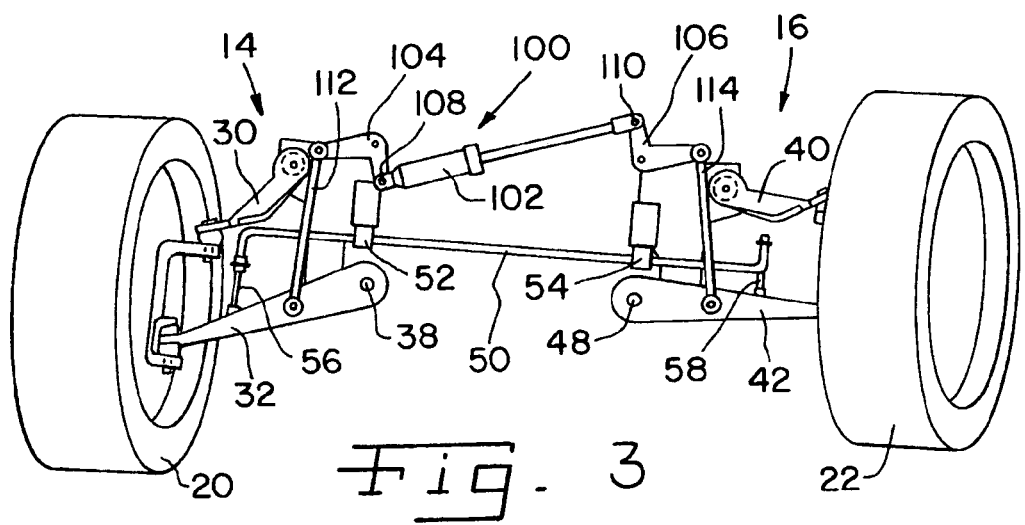
FIG. 3 is a perspective view similar to FIGS. 1 and 2 but illustrating a manner and location of installing the roll damper system with improved ground clearance.

In sport utility vehicles, trucks and the like it is desirable to retain high ground clearance. FIG. 3 illustrates a roll damping system 100 in accordance with the present invention which is configured and installed entirely above the standard structures for primary suspension systems 14 and 16 and torsional roll stabilizer system 18. A damper 102 is connected to bell cranks 104 and 106 having pivots 108 and 110, respectively, connected to frame members 34 and 44, respectively. A rod 112 is pivotally connected to bell crank 104 and lower control arm 32. A rod 114 is pivotally connected to bell crank 106 and lower control arm 42. Damper 102 is positioned above torsion bar 50, and the connections therefrom to control arms 32 and 42 are from above the control arms. As a result, damping system 100 does not reduce ground clearance otherwise available without roll damping system 100

Figure 4:
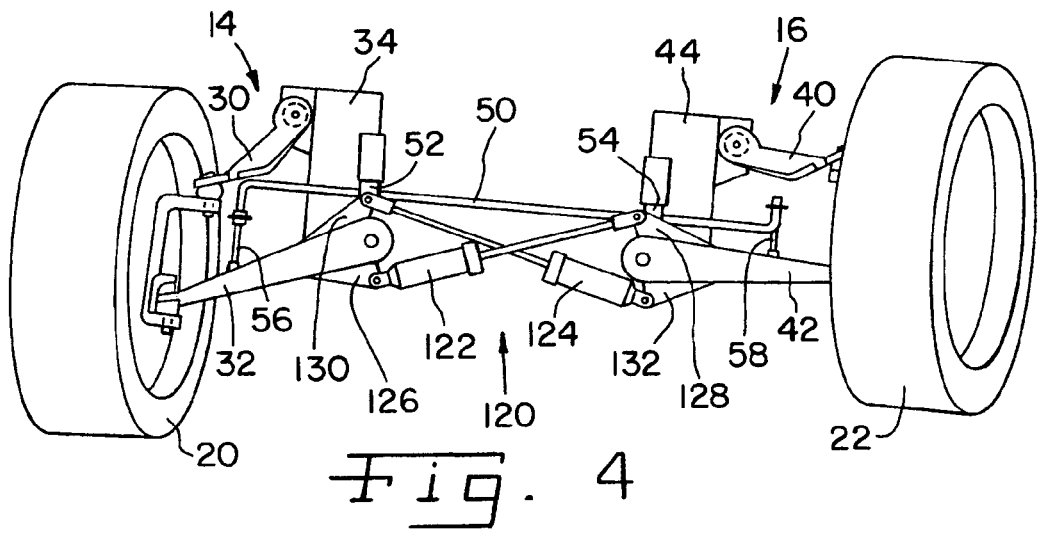
FIG. 4 is a perspective view similar to FIG. 2 but illustrating an alternate embodiment of the roll damper system in accordance with the present invention.

Roll damper systems having twin dampers also can be provided. FIG. 4 illustrates a twin damper roll damping system 120 having first and second dampers 122 and 124. Damper 122 is connected between a lower bell crank 126 on lower control arm 32 and an upper bell crank 128 on lower control arm 42. Damper 124 is connected between an upper bell crank 130 on lower control arm 32 and a lower bell crank 132 on lower control arm 42.

Figure 5:
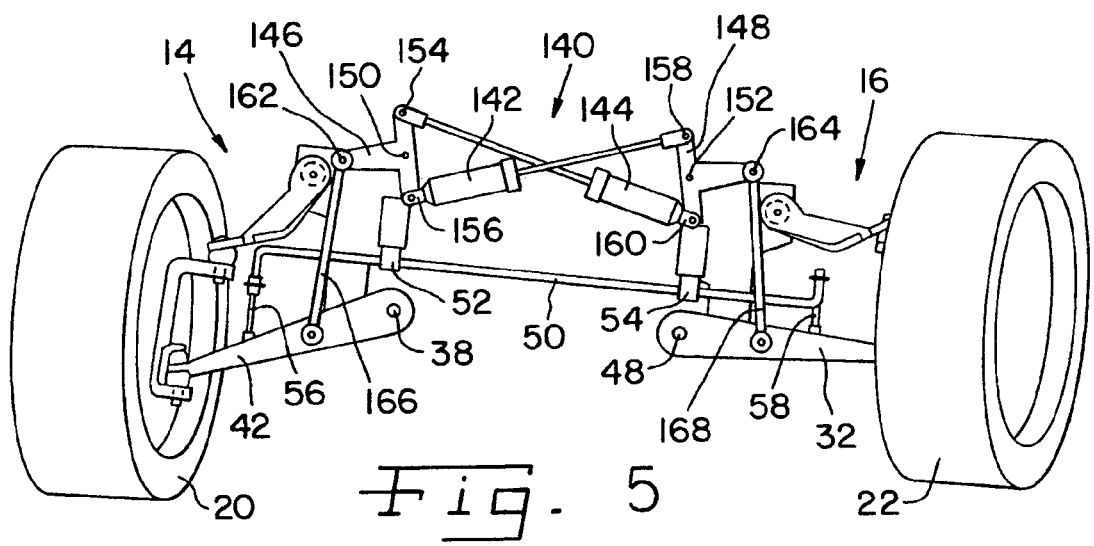
FIG. 5 is a perspective view of the embodiment shown in FIG. 4, but illustrating an alternate location for installation of the system to have greater ground clearance.

To provide improved ground clearance and other advantages, a dual damper roll damping system in accordance with the present invention can be installed above the primary suspension systems and the torsional roll stabilizing system. FIG. 5 illustrates a dual damper roll damping system 140 having first and second dampers 142 and 144. T-cranks 146 and 148 are pivotally connected to the vehicle body at pivot points 150 and 152. Upper and lower ends 154 and 156 of T-crank 146 are connected to damper 144 and 142, respectively. Upper and lower ends 158 and 160, respectively of T-crank 148 are connected to opposite ends of damper 142 and 144, respectively from the ends connected to T-crank 146. Outer ends 162 and 164 of T-cranks 146 and 148, respectively, are pivotally connected by rods 166 and 168, respectively to lower control arms 32 and 42, respectively.

It should be understood that although the present invention has been shown and described for use with torsional stabilizer system 18, roll damping systems of the present invention can be used without stabilizer system 18. Further, rather than a torsional stabilizer system, the vehicle can be equipped with other types of stabilizer systems, including single compensator stabilizing systems and dual compensator stabilizing systems. Since the roll dampers and roll damping system can be provided separately and independently from the stabilizer and primary suspension systems, these previously known and accepted systems can be used for the best performance of each on the vehicle, without compromising performance to achieve greater roll damping.

Figure 6:
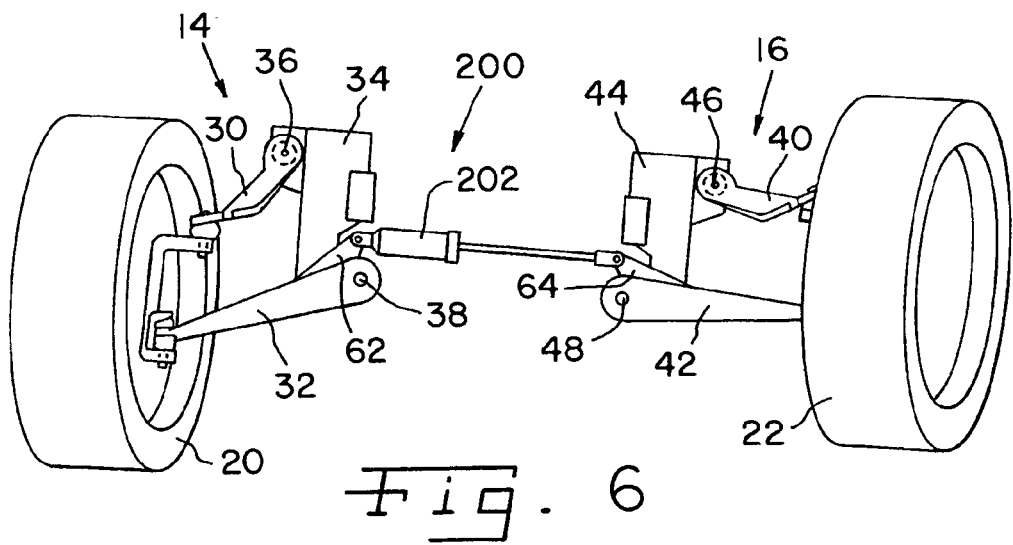
FIG. 6 is a perspective view of a vehicle having a single compensating stabilizer with an integral roll damper in accordance with the present invention.
Figure 7:
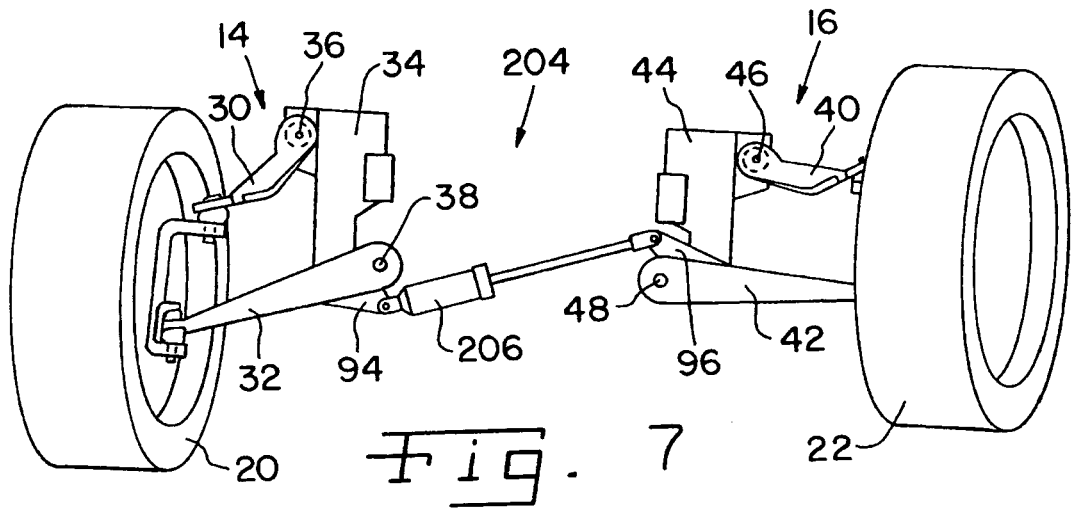
FIG. 7 is a perspective view of the vehicle suspension system shown in FIG. 6 but illustrating an alternate installation of the single compensating stabilizer with an integral roll damper of the present invention.
Figure 8:
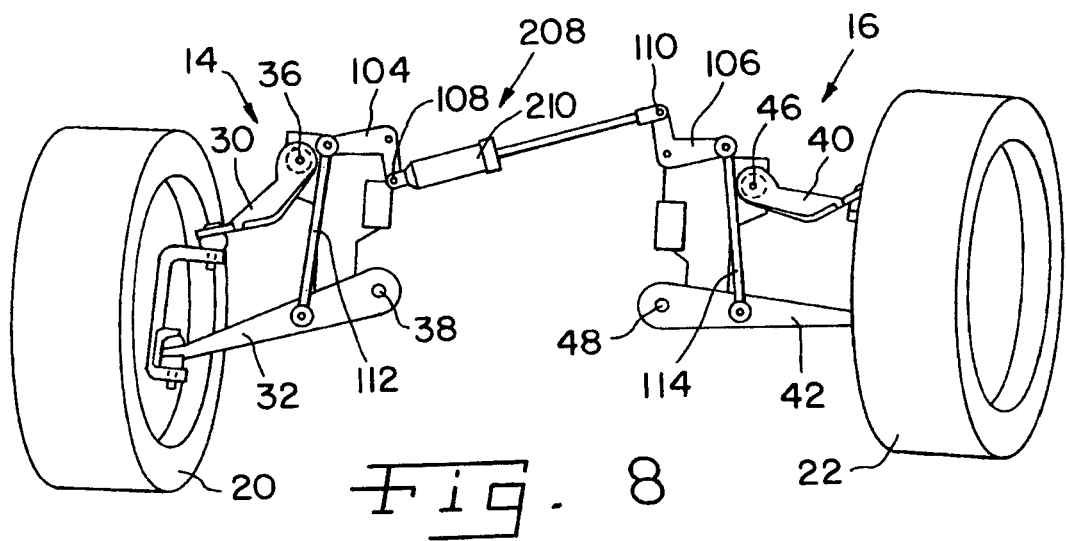
FIG. 8 is a perspective view of the vehicle suspension system showing yet another alternate installation of a single compensator stabilizer with an integral roll damper of the present invention.

Roll damping systems of the present invention also can be provided integrally with single compensators for single compensating stabilizer systems or dual compensators used in dual compensating stabilizer systems. Installations thereof are similar to those shown with respect to FIGS. 1-5; however, torsional roll stabilizer systems 18 are not required. Accordingly, FIG. 6 illustrates a single roll damping/compensating system 200 having a damper/compensator 202 incorporating both roll damping and compensating. Damper/compensator 202 is connected between bell cranks 62 and 64 as described previously with respect to FIG. 1. FIG. 7 illustrates a damping/compensating system 204 having a damper/compensator 206 incorporating both roll damping and compensating. Damper/compensator 206 is connected between bell cranks 94 and 96 in a manner as described with respect to FIG. 2. FIG. 8 illustrates a single roll damping/compensating stabilizer 208 having a damper/compensator 210 incorporating both roll damping and compensating. Damper/compensator 210 is connected between bell cranks 104 and 106 in a manner similar to that described with respect to FIG. 3. Damper/compensators 202, 206 and 210 incorporate roll compensating functions as with heretofore known compensators for single compensator systems. Accordingly, damper compensators 202, 206 and 210 provide spring force in both compression and tension. Additionally, however, each further includes a roll damping section therein. An exemplary embodiment will be described hereinafter with respect to FIGS. 11-13.

Figure 9:
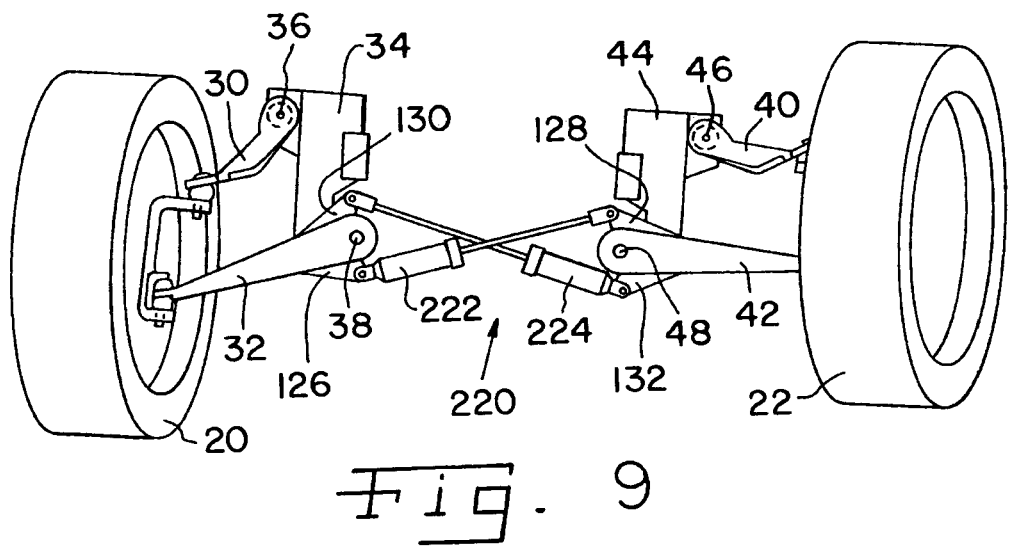
FIG. 9 is a perspective view of a dual compensating stabilizer system having integral roll damping in accordance with the present invention.
Figure 10:
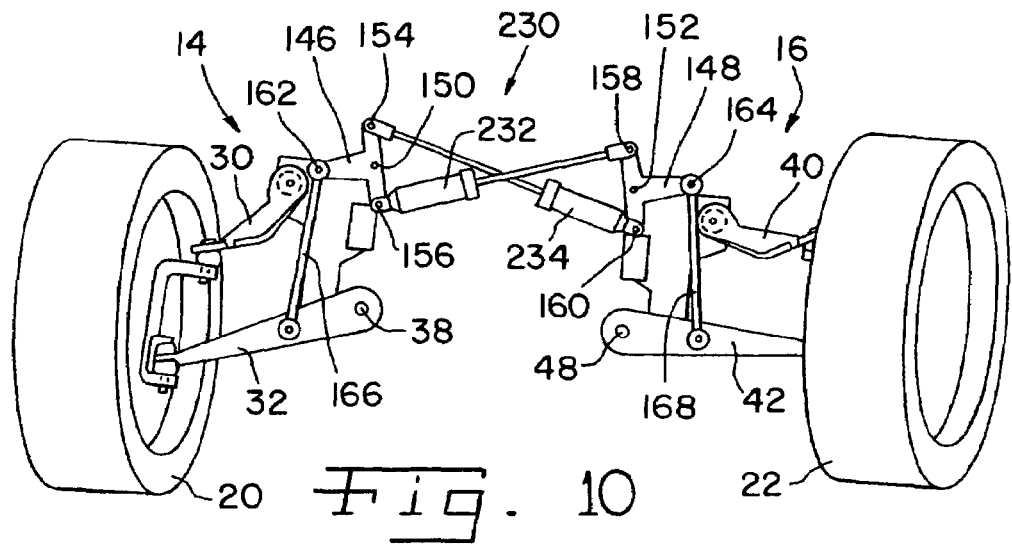
FIG. 10 is a perspective view of a system similar to that shown in FIG. 6 but illustrating an alternate installation location for increased ground clearance.

Roll damping in accordance with the present invention also can be provided as an integral component of dual compensating stabilizer systems. FIG. 9 illustrates a dual roll damping/compensating system 220 having damper/compensators 222 and 224 which include both roll damping and roll compensating functions accordance with the present invention. Damper/compensators 222 and 224 are connected between bell cranks 126, 128, 130 and 132 similarly as described with respect to FIG. 4. FIG. 10 illustrates a dual roll damping/compensating system 230 having damper/compensators 232 and 234 which include both roll damping and roll compensating functions accordance with the present invention. Damper/compensators 232 and 234 are interconnected between T-cranks 146 and 148 in a manner similar to that described with respect to FIG. 5. Damper/compensators 222, 224, 232, 234, 242 and 244 incorporate roll compensating functions as with heretofore known compensators for dual compensator systems. Accordingly, damper compensators 222, 224, 232, 234, 242 and 244 provide spring force in tension and no load in compression. Additionally, however, each further includes a roll damping section therein. An exemplary embodiment will be described hereinafter with respect to FIGS. 14-16.

Figure 11:
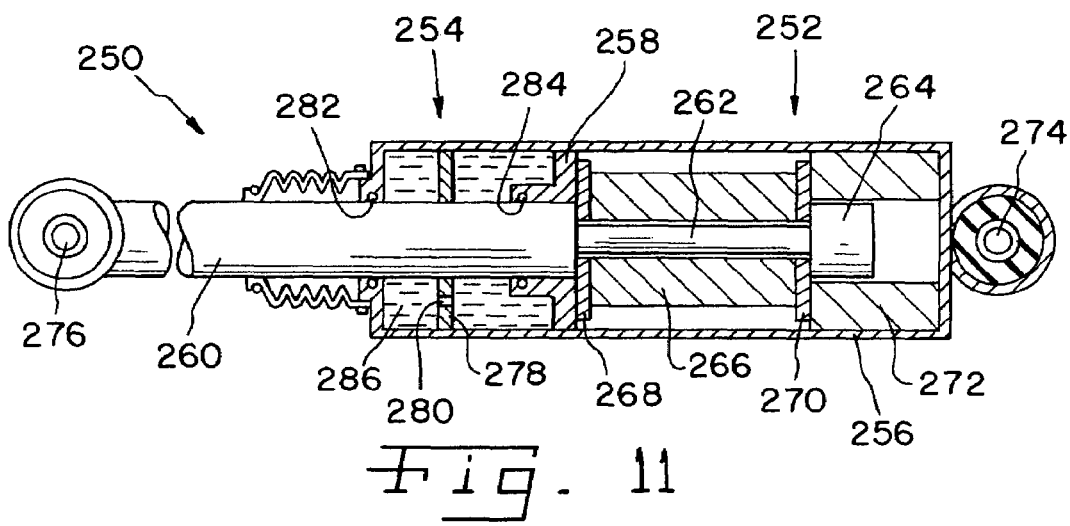
FIG. 11 is a cross-sectional view of a compensator with integral roll damping in accordance with the present invention, suitable for use in a single compensator stabilizer system.
Figure 12:
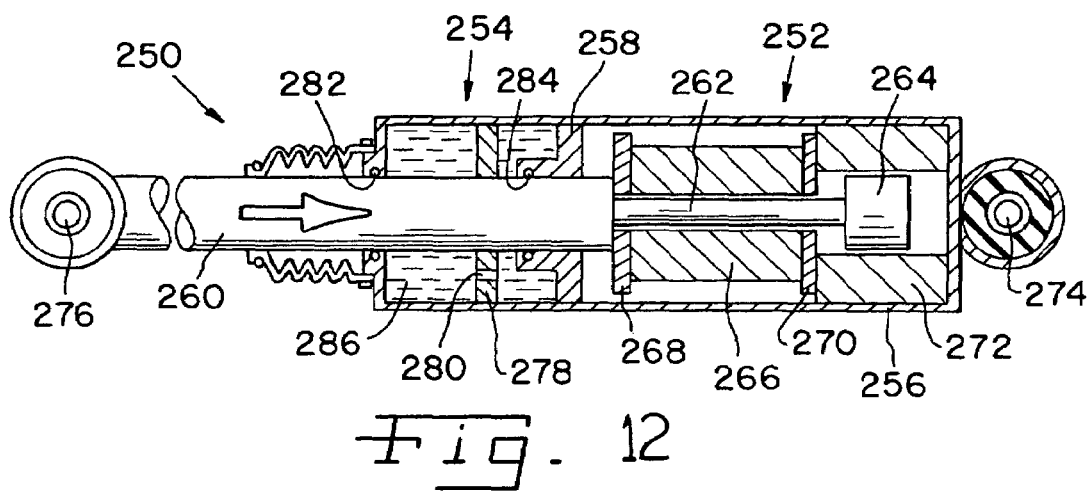
FIG. 12 is a cross-sectional view similar to that of FIG. 11, but illustrating the compensator in compression.
Figure 13:
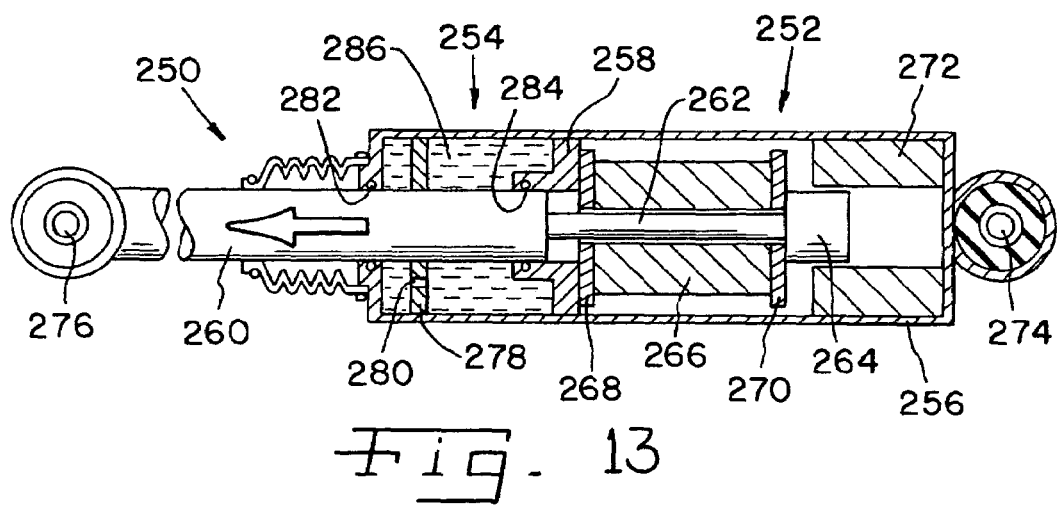
FIG. 13 is a cross-sectional view similar to FIGS. 11 and 12, but illustrating the compensator in tension.

FIGS. 11-13 illustrate an exemplary damper/compensator suitable for use in single damping/compensating systems of the present invention. Exemplary damper/compensator 250 includes a roll compensating section 252 for exerting spring force to urge return of a vehicle body to neutral position. Damping compensator 250 further includes a damping section 254 as an integral component of damper/compensator 250. Roll compensating section 252 and damping section 254 are contained in a common housing or can 256. An internal barrier or wall 258 separates roll compensating section 252 from damping section 254. A rod 260 extends from outside of can 256 through barrier 258 and has a narrowed portion 262 within roll compensating section 252. At the inner end of rod 260, a head 264 terminates narrowed portion 262. A spring 266 is disposed on narrowed portion 262 between washers 268 and 270. Head 264 slides in a spool 272. Pivotal connections 274 and 276 are provided on can 256 and the outer end of rod 260, respectively. Damping compensator 250 is connected within the suspension system as described previously via pivotal connections 274 and 276.

Damping section 254 includes a wall 278 on rod 260. Wall 278 slides within damping section 254 as rod 260 moves inwardly and outwardly of can 256. One or more openings or valves 280 are provided in wall 278. O-ring seals 282 and 284 are provided between rod 260 and can 256 and wall 258, respectively. Damping section 254 is filled with damping fluid 286, which maybe magneto-rheological fluid as described previously herein, or other types of fluid commonly used in dampers.

FIGS. 12 and 13 illustrate damper/compensator 250 placed in compression and in tension, respectively. When placed in compression, washer 268 is moved toward spool 272, against which washer 270 is abutted, as a length of narrowed portion 262 slides there through and washer 268 approaches washer 270. Thus, spring 268 is compressed between washer 270 and washer 272 as the distance there between lessens. Conversely, when damper/compensator 250 is placed in tension (FIG. 13), washer 270 is abutted against barrier 258 and again spring 268 is compressed between washers 268 and 270 when washer 270 is pulled toward washer 268 by head 264 as rod 260 moves outwardly. Thus, roll damper/compensator provides spring force in both compression and in tension As rod 260 is moved in conditions of either compression or tension, wall 278 is caused to move within damping section 254 and the damping fluid 286 contained therein. Valves 280 or openings 280 in wall 278 control and inhibit passage of damping fluid 280 from one side of wall 278 to the opposite side of wall 278. Further, spaces can be provided between the outer periphery of wall 278 and the inner surface of can 256 within damping section 254. Such space can provide a path for the flow of damping fluid 286 from one side of wall 278 to the opposite side of the wall 278. Other flow control configurations also can be provided for the passage of fluid between opposite sides of wall 278. By controlling valves 280, the conditions, such as viscosity, of damping fluid 286 and the like, as described previously herein, control the ease with which wall 278 moves through damping fluid 286. Accordingly, the damping force from damping section 254 is modulated. Thus, the exemplary embodiment of damper/compensator 250 provides both spring force for returning a vehicle out of a roll condition and damping or resistance to the commencement of vehicle body roll through the operation of damping section 254.

Figure 14:
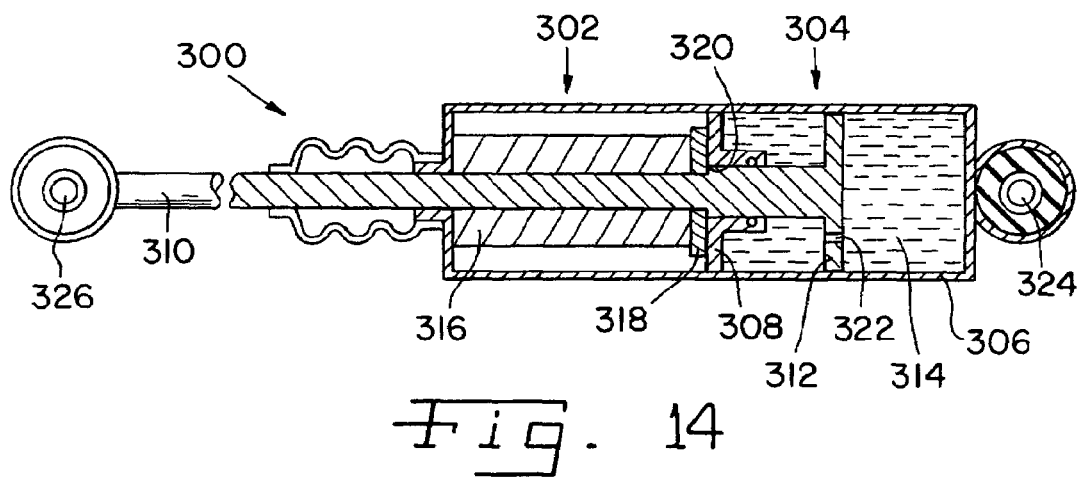
FIG. 14 is a cross-sectional view of a compensator with integral roll damping in accordance with the present invention, suitable for use in a dual compensating stabilizer system.
Figure 15:
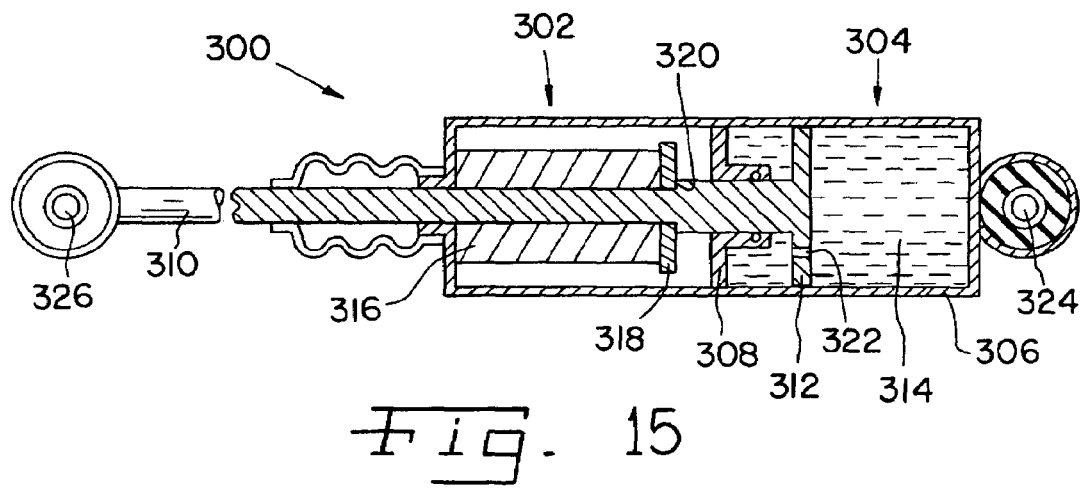
FIG. 15 is a cross-sectional view similar to that of FIG. 14, but illustrating the compensator of FIG. 14 in tension.
Figure 16:
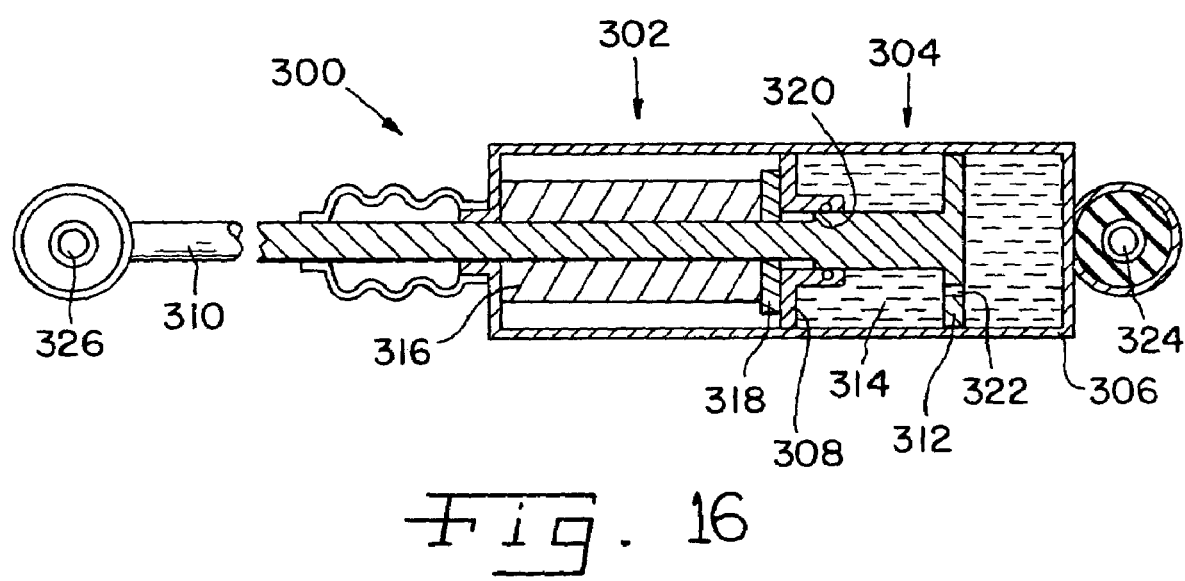
FIG. 16 is a cross-sectional view similar to FIGS. 14 and 15, but illustrating the compensator thereof in compression.

FIGS. 14-16 illustrate an exemplary damper/compensator suitable for use in dual damping/compensating systems of the present invention. Exemplary damper/compensator 300 includes a roll compensating section 302 for exerting spring force to urge return of a vehicle body to neutral position. Damper/compensator 300 further includes a damping section 304 as an integral component of damper/compensator 300. Roll compensating section 302 and damping section 304 are contained in a common housing or can 306, and are separated by a barrier or wall 308. A rod 310 extends from outside of can 306 to damping section 304, passing through wall 308. A head 312 is movable through damping fluid 314 contained in damping section 304. A spring 316 is provided between an end of can 306 and a washer 318 provided on rod 310. A shoulder 320 on rod 310 moves washer 318 toward an end of can 306, thereby compressing spring 316 when damper/compensator 300 is placed in tension, as illustrated in FIG. 15. Pivotal connections 324 and 326 are provided on housing/can 306 and the outer end of rod 310, respectively.

When damper/compensator 300 is placed in compression, no spring force is provided by spring 316 as illustrated in FIG. 16. Those skilled in the art will understand that the configuration of head 312, with valves or holes 322 therein, as described previously can control the flow of fluid to opposite sides of head 312 to provide damping when damper/compensator 300 is placed in tension and no damping or minimal damping when damper/compensator 300 is placed in compression.

Dampers or damping sections on integral damper/compensators can be provided to manifest damping only when a roll condition is experienced and not when normal vehicle movements occur. In some situations it may be desirable that a damper or the damper section of an integral damper/compensator operate only when the compensator is or will become active. It can be seen that structures in accordance with the present invention installed as described previously can be configured to provide damping only under the conditions of potential rollover.

Figure 17:
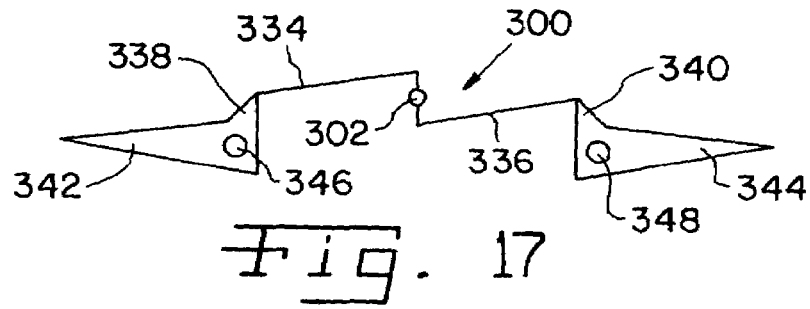
FIG. 17 is a schematic illustration of a still further embodiment of the present invention using a rotary damper that can be independent of or incorporated with a stabilizer system that may also be installed on the vehicle.

As shown and described thus far, dampers used in the present invention are linear dampers. However, it should be understood that a damping system in accordance with the present invention can be installed in a manner so as to use rotary dampers rather than linear dampers. FIG. 17 illustrates a damping system 330 in which a rotary damper 332 is connected to links 334 and 336. Links 334 and 336 are further connected to bell cranks 338 and 340, respectively, of a vehicle suspension system having control arms 342, 344 movable about pivots 346, 348, respectively.

Figure 18:
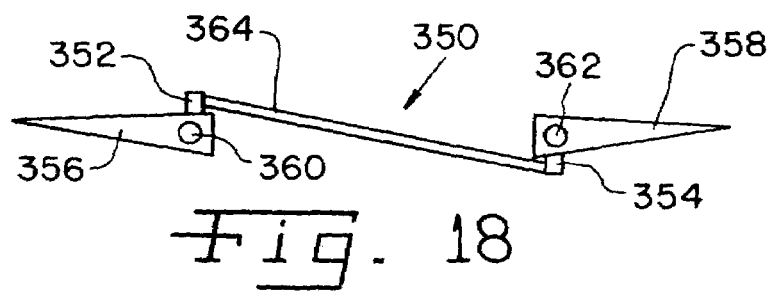
FIG. 18 is a schematic illustration of yet another embodiment of a roll damping system in accordance with the present invention that can be used independent of or incorporated with a stabilizer system that may also be installed on the vehicle.

FIG. 18 illustrates a damping system 350 in accordance with the present invention in which first and second rotary dampers 352 and 354 are connected to first and second pivotal components 356 and 358, respectively, such as suspension control arms. Pivotal components 356 and 358 are vehicle suspension system components pivotally connected about pivotal axes 360 and 362, respectively. Rotary dampers 352 and 354 are connected to each other by a link 364.

In the examples of the present invention shown in FIGS. 17 and 18, links 334, 336 and 364 can be rigid bar or rod like links, or can be constructed and configured as single compensators for single compensating stabilizing systems or dual compensators configured for dual compensating stabilizing systems.

Figure 19:
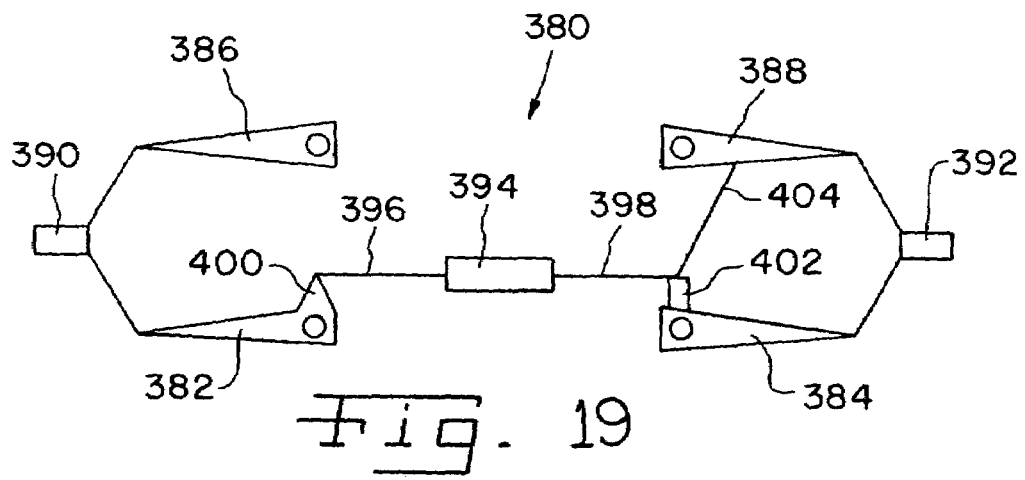
FIG. 19 is a schematic illustration of still another roll damping system in accordance with the present invention.

FIG. 19 illustrates yet another system in accordance with the present invention which utilizes a bell crank, a rotary damper and a single roll compensator. Damping system 380 is shown on a vehicle suspension system having first and second lower control arms 382, 384, first and second upper control arms 386, 388, respectively, and first and second wheel hubs 390, 392. Damping system 380 includes a double chamber, double acting damper 394 connected by rods 396, 398 to a bell crank 400 and a rotary damper 402 on lower control arms 382, 384, respectively. A rigid link 404 connects rotary damper 402 to upper control arm 388.

Figure 20:
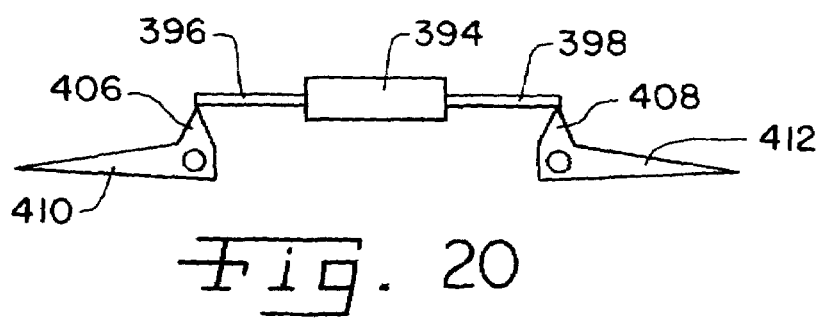
FIG. 20 is a schematic illustration of a roll damper system of the present invention having a single, double chamber damper.

FIG. 20 illustrates yet another embodiment of the present invention which utilizes a dual chamber, double acting damper 394 as shown in FIG. 19 but connected between bell cranks 406, 408 on control arms 410, 412, respectively. Double acting damper 394 can be anchored to a frame component of a vehicle, or can be floating between bell cranks 406, 408.

Figure 21:
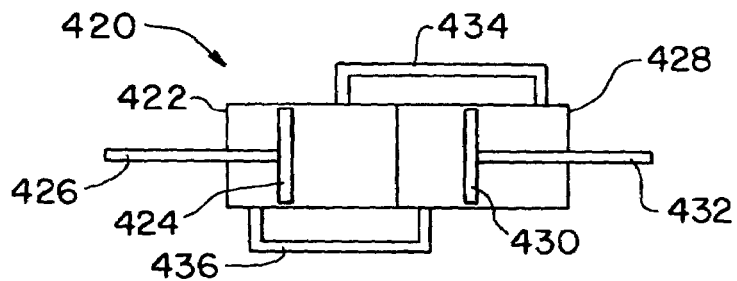
FIG. 21 is a schematic, cross-sectional illustration of a dual chamber damper.

FIG. 21 is a schematic illustration of a dual chamber double acting damper/compensator 420 which could be used in the systems shown in FIGS. 19 and 20. Damper 420 includes a first cylinder 422 having a piston 424 operatively disposed therein connected to a rod 426. A second cylinder 428 having a piston 430 connected to a rod 432 is disposed in head-to-head relationship with cylinder 420. First and second bypass lines 434, 436 interconnect chambers 420, 428 on opposite sides of pistons 424, 430.

Roll dampers of the present invention also can be incorporated with conventional ride dampers, commonly referred to as shock absorbers, of conventional vehicle suspension system ride control. FIG. 20 illustrates a combined ride and roll damper system 450 which has first and second ride/roll dampers 452, 454, respectively. Ride/roll damper 452 includes a ride damper cylinder 456 and a roll damper cylinder 458 in side-by-side relationship. Ride damper cylinder 456 includes a piston 460 connected by a link 462 to a control arm 464 on the vehicle. Roll damper cylinder 458 includes a piston 466 connected by a link 468 to link 462. Ride/roll damper 454 includes a ride damper cylinder 470 and a roll damper cylinder 472. Ride damper cylinder 470 includes a piston 474 connected by a link 476 to a control arm 478. Roll damper cylinder 472 includes a piston 480 connected by a link 482 to link 476. Bypass lines 484, 486 interconnect roll dampers 458 and 472 on opposite sides of pistons 466 and 480, respectively. System 450 provides conventional ride damping from ride damper cylinders 456 and 470 when movement inputs of one wheel only or of both wheels in the same direction are provided. However, if inputs from wheels via control arms 464, 478 are in opposite directions roll damper cylinders 458, 472 are effective in providing additional damping to the movement of control arms 464, 478. Accordingly, potential roll conditions are damped without affecting ride damping and accordingly ride feel of the vehicle on which system 405 is installed.

Figure 22:
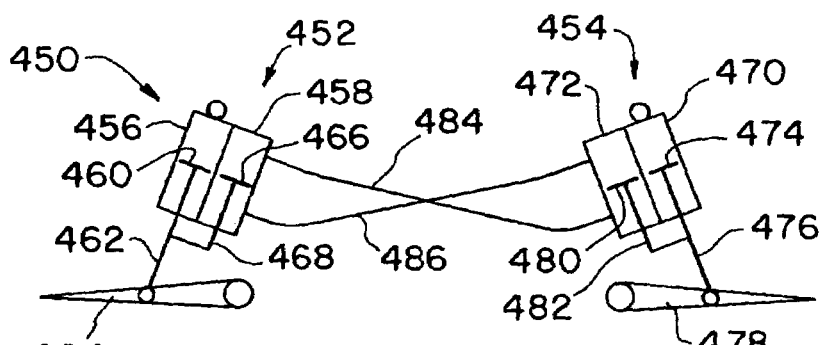
FIG. 22 is a schematic illustration of roll damping system of the present invention having individual roll dampers combined with conventional ride dampers.
Figure 23:
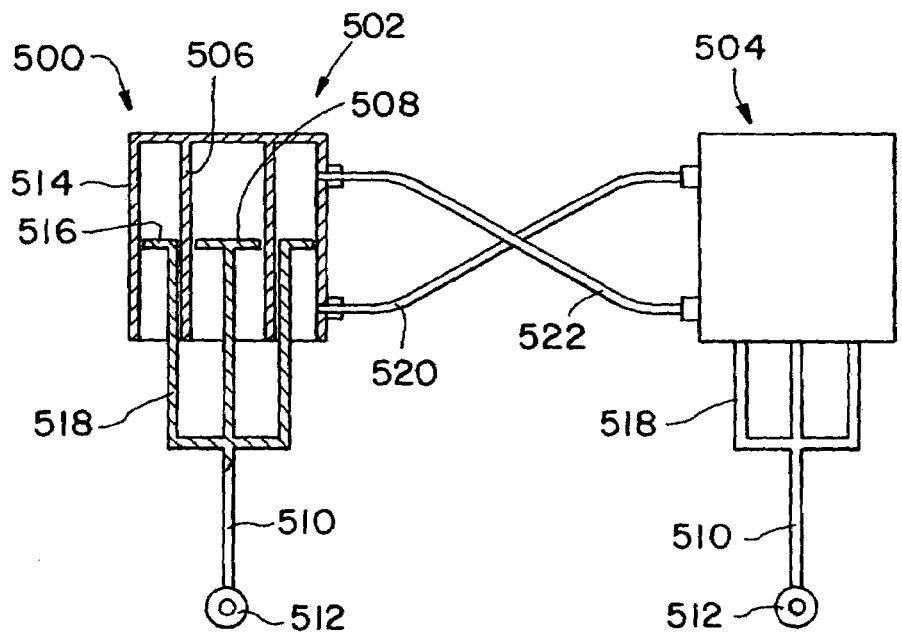
FIG. 23 is a schematic illustration, in partial cross-section of a roll damping system of the present invention having roll dampers and ride dampers that are coaxial.

While FIG. 22 illustrates a side-by-side system, the present invention also can be utilized in a coaxial system in which the ride dampers and roll dampers are provided in coaxial, inner and outer positions. A combined ride damping and roll damping system 500 is illustrated in FIG. 23 having first and second ride/roll dampers 502, 504, respectively. Ride/roll dampers 502 and 504 are similar in construction, and only ride/roll damper 502 is shown in cross section. Ride/roll damper 502 includes a central ride damping cylinder 506 having a piston 508 therein connected by a link 510 to a pivotal connection 512 on a control arm or the like of a vehicle suspension. A roll damping cylinder 514 surrounds ride damping cylinder 506 and includes an annular piston 516 therein connected by a link 518 to link 510. As mentioned previously, unit 504 includes similar structure and is therefore similarly numbered to unit 502. However, since unit 504 is not shown in cross section, only links 510 and 518 and pivotal connection 512 are shown. In a fashion similar to that shown in FIG. 20, opposite sides of the roll damping pistons in units 502 and 504 are connected by bypass lines 520, 522. Thus, as with system 450 shown and described with respect to FIG. 22, system 500 also operates such that single wheel inputs or inputs from both wheels in the same direction are controlled only by the ride dampers and the movements of the roll dampers are substantially non-effective in altering the ride or feel of the vehicle. However, if a roll condition is encountered in which vehicle inputs are in opposite directions, the roll damping sections of the coaxial units are effective in providing additional damping to the movement of suspension systems or control arms to which pivotal connections 512 are made. Thus, a potential roll condition is inhibited without affecting normal ride of the vehicle.

It should be understood that roll damper systems or roll damper embodiments of the present invention can be actively or passively controlled. Active control with control system 70 shown in FIG. 1 and the various modifications thereof described previously herein can be used. Other suitable control systems using, for example, electronically controllable valves, electronically alterable magnetic fluid or the like can be used for active control of any of the systems or roll dampers shown and described, including variations thereof.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A body roll damping system for a motor vehicle, comprising:
   first and second pivotal suspension components pivotally rotatable about first and second axes;
   at least one passive two-way roll damper configured for damping in both tension and compression;
   first and second connections between said at least one passive two-way roll damper and said first and second pivotal components; and
   said at least one passive two-way roll damper and said first and second connections associated and operatively connected with one another such that said at least one passive two-way roll damper provides increased damping resistance to substantially simultaneous rotation of said first and second pivotal suspension components in the same rotational directions about said first and second axes, and lessened damping resistance to rotation of said first and second pivotal suspension components in opposite rotational directions about said first and second axes and to rotation of one of said first and second pivotal suspension components without significant rotation of the other of said first and second pivotal suspension components.

2. The damping system of claim 1, said at least one passive two-way roll damper being connected to one of said pivotal suspension components from above said one of said pivotal suspension components and to the other of said pivotal suspension components from below said other of said pivotal suspension components.

3. The damping system of claim 1, said at least one roll damper being connected to each of said first and second pivotal suspension components from above said first and second pivotal suspension components.

4. The damping system of claim 1, said at least one roll damper being connected to each of said first and second pivotal suspension components from below said first and second pivotal suspension components.

5. The damping system of claim 1 including first and second pivotal cranks, said at least one roll damper being connected at opposite ends thereof to said first and second pivotal cranks, and first and second rods connecting said first and second pivotal cranks to said first and second pivotal components, respectively.

6. The damping system of claim 1, said at least one roll damper including first and second roll dampers, said first roll damper being connected to said first pivotal suspension component from below said first pivotal suspension component and being connected to said second pivotal suspension component from above said second pivotal suspension component; and said second roll damper being connected to said first pivotal suspension component from above said first pivotal suspension component and being connected to said second pivotal suspension component from below said second pivotal suspension component.

7. The damping system of claim 1, said at least one damper including first and second roll dampers, said system further including first and second T-cranks pivotally connected intermediate first and second ends thereof, said first roll damper being connected to a lower end of said first T-crank and to an upper end of said second T-crank, said second roll damper being connected to an upper end of said first T-crank and to a lower end of said second T-crank, and first and second rods connecting said first and second T-cranks to said first and second pivotal components, respectively.

8. The damping system of claim 1, including a torsion bar roll stabilizer connected to said first and second pivotal components.

9. The damping system of claim 1, including a linear compensator roll stabilizer connected to said first and second pivotal components.

10. The damping system of claim 1, said at least one roll damper being a roll damping section of a roll damper and compensator having a separate roll compensating section therein.

11. The damping system of claim 1, said at least one roll damper including an outer can and a barrier thereon dividing an interior volume of said can into a roll compensating section and a roll damping section on opposite sides of said barrier; a rod axially slidable in said can; a spring disposed on one side of said barrier biasing movement of said rod in at least one direction and damping fluid in said damping section on a side of said barrier opposite said spring.

12. The damping system of claim 11, including a wall connected to said rod in said damping section, said wall having openings for passage of damping fluid from one side of said wall to an opposite side of said wall.

13. The damping system of claim 11, said rod having a head and said spring disposed on said rod between said head and said barrier.

14. The damping system of claim 11, said rod having a head thereon disposed in said damping section of said can.

15. The damping system of claim 1, said at least one passive two-way roll damper being at least one axial two-way damper.

16. The damping system of claim 1, said at least one roll damper being at least one rotary damper.

17. The damping system of claim 1, said at least one roll damper including a first rotary damper connected to said first pivotal suspension component, a second rotary damper connected to said second pivotal suspension component and a link interconnecting said first and second rotary dampers.

18. The damping system of claim 17, said link being a roll compensating stabilizer.

19. The damping system of claim 1 including a damper compensator having first and second opposed cylinders, a first rod and a first piston connected to said first rod disposed and axially translatable in said first cylinder, a second rod and a second piston connected to said second rod and axially translatable in said second cylinder, and first and second bypass lines interconnecting said first and second cylinders.

20. The damping system of claim 1 including a first ride damper connected to said first pivotal suspension component, a second ride damper connected to said second pivotal suspension component, a first roll damper associated with said first ride damper through a first common connection to said first pivotal suspension component, and a second roll damper associated with said second ride damper through a second common connection to said second pivotal suspension component.

21. The damping system of claim 20, said associated ride dampers and roll dampers disposed in side-by-side relationship.

22. The damping system of claim 20, said associated ride dampers and roll dampers disposed in coaxial relationship.

23. A vehicle front wheel assembly comprising:
first and second primary suspension systems having first and second pivotal suspension components pivotally rotatable about first and second axes;
at least one roll stabilizer connected to said first and second suspension components;
at least one passive axial two-way roll damper configured for damping in both tension and compression;
first and second connections between said at least one passive axial two-way roll damper and said first and second pivotal components; and
said at least one passive axial two-way roll damper and said first and second connections associated and operatively connected with one another such that said at least one passive axial two-way roll damper provides increased damping resistance to substantially simultaneous rotation of said first and second pivotal suspension components in the same rotational directions about said first and second axes, and lessened damping resistance to rotation of said first and second pivotal suspension components in opposite rotational directions about said first and second axes and to rotation of one of said first and second pivotal suspension components without significant rotation of the other of said first and second pivotal suspension components.

24. The front wheel assembly of claim 23, said at least one roll stabilizer including a torsion bar.

25. The front wheel assembly of claim 23, said at least one roll stabilizer including a single compensator linear stabilizer.

26. The front wheel assembly of claim 23, said at least one roll stabilizer including a dual compensator linear stabilizer.

* * * * *

UNITED STATES PATENT AND TRADEMARK OFFICE
CERTIFICATE OF CORRECTION

PATENT NO.      : 7,628,414 B2                          Page 1 of 1
APPLICATION NO. : 11/188682
DATED           : December 8, 2009
INVENTOR(S)     : Dobson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 923 days.

Signed and Sealed this

Second Day of November, 2010

David J. Kappos
*Director of the United States Patent and Trademark Office*